United States Patent
Yonemoto et al.

(10) Patent No.: US 7,745,529 B2
(45) Date of Patent: Jun. 29, 2010

(54) FLOCCULANT COMPOSITION AND METHOD FOR MANUFACTURING THE SAME

(75) Inventors: Ryousuke Yonemoto, Tokyo (JP); Syougo Wakatuki, Tokyo (JP)

(73) Assignee: HYMO Corporation, Tokyo (JP)

( * ) Notice: Subject to any disclaimer, the term of this patent is extended or adjusted under 35 U.S.C. 154(b) by 0 days.

(21) Appl. No.: 12/362,916

(22) Filed: Jan. 30, 2009

(65) Prior Publication Data
US 2009/0137720 A1     May 28, 2009

Related U.S. Application Data

(63) Continuation of application No. PCT/JP2006/315886, filed on Aug. 3, 2006.

(51) Int. Cl.
C09D 5/02 (2006.01)
C08F 214/08 (2006.01)

(52) U.S. Cl. ........................ 524/521; 524/519
(58) Field of Classification Search ............ 524/521
See application file for complete search history.

(56) References Cited

U.S. PATENT DOCUMENTS 4,720,346 A   1/1988   Flesher et al.

FOREIGN PATENT DOCUMENTS

| EP | 0374458 A2 | 6/1990 |
|---|---|---|
| JP | 2219887 A | 9/1990 |
| JP | 7256299 | 10/1995 |
| JP | 7256300 | 10/1995 |
| JP | 2004025094 | 1/2004 |
| JP | 2004025095 | 1/2004 |
| JP | 2004025097 | 1/2004 |
| JP | 2004057837 | 2/2004 |
| JP | 2004057837 A * | 2/2004 |
| JP | 2004059719 | 2/2004 |
| JP | 2004290823 | 10/2004 |
| JP | 2005144346 | 6/2005 |
| JP | 2005177666 | 7/2005 |
| JP | 2005199185 | 7/2005 |
| JP | 2006000759 | 1/2006 |

OTHER PUBLICATIONS

Translation of JP 2004057837, Feb. 2004.*

* cited by examiner

Primary Examiner—Ling-Siu Choi
Assistant Examiner—Hui Chin
(74) Attorney, Agent, or Firm—Weingarten, Schurgin, Gagnebin & Lebovici LLP

(57) ABSTRACT

A flocculent composition and a method for manufacturing the same are provided. The flocculent composition has an excellent ability to adhere to suspended particles, does not cause an increase in the viscosity of sludge, provides good drainage during mechanical dewatering to allow a reduction in the water content of a cake, and is applicable to various types of sludge. These characteristics are obtained by utilizing advantages of a crosslinking water-soluble polymer and a linear water-soluble polymer and changing the compounding ratio of the crosslinking water-soluble polymer to the linear water-soluble polymer according to the form of the size distribution of sludge particles. The flocculent composition includes a vinyl crosslinking water-soluble polymer (A) having a charge inclusion ratio of 20% or more and a vinyl linear water-soluble polymer (B) having a charge inclusion ratio of 5% or more and less than 20%.

The flocculant composition is preferably configured such that the compounding ratio of the vinyl crosslinking water-soluble polymer (A) having a charge inclusion ratio of 20% or more to the vinyl linear water-soluble polymer (B) having a charge inclusion ratio of 5% or more and less than 20% is changed according to a change in the percent by mass of 200-mesh particles in sludge based on the total mass of the suspended particles in the sludge.

12 Claims, No Drawings

FLOCCULANT COMPOSITION AND METHOD FOR MANUFACTURING THE SAME

TECHNICAL FIELD

The present invention relates to a flocculant composition and to a method for manufacturing the same. The inventive flocculant composition has an excellent ability to adhere to suspended particles, does not cause an increase in the viscosity of sludge, provides good drainage during mechanical dewatering to allow a reduction in the water content of a cake, and is applicable to various types of sludge. These characteristics are obtained by utilizing advantages of a crosslinking water-soluble polymer and a linear water-soluble polymer and changing the compounding ratio of the crosslinking water-soluble polymer to the linear water-soluble polymer according to the form of the size distribution of sludge particles.

BACKGROUND ART

Conventionally, a cationic polymer flocculent is used as a retention aid in paper making and for dewatering sewage sludge and the like. In recent years, the amount of generated sludge is increasing, and the properties of the sludge are becoming worse. However, with conventional cationic polymer flocculants, the amount of treatable sludge is limited, and the treatment conditions are not satisfactory in terms of the water content of a dewatered cake, the SS recovery rate, the removability of a cake from filter cloth, and the like. Therefore, there is a strong demand to improve sludge dewatering agents. To improve the drawbacks of conventional cationic polymer flocculants, various amphoteric polymer flocculants have been proposed. However, such amphoteric polymer flocculants are not fully satisfactory.

Moreover, crosslinking ionic polymer flocculants have been disclosed for the purpose of reducing the water content of a dewatered cake and of improving the removability from filter cloth (see, for example, Japanese Patent Application Laid-Open No. Hei 02-219887 (European Patent Application Laid-Open No. 374458 A2) and Japanese Patent Application Laid-Open No. Sho 61-293510 (U.S. Pat. No. 4,720,346).

As described above, crosslinking water-soluble polymers have various characteristics and functions. However, disadvantageously, when such a crosslinking water-soluble polymer is used in a sludge dewatering agent, a retention aid in paper making, or the like, the amount required to be added is greater than those of linear polymers. This may be because the extension of crosslinking water-soluble polymer molecules in an aqueous solution is smaller relative to that of linear polymers. To improve such a drawback of the crosslinking water-soluble polymers, amphoteric polymer dewatering agents have been disclosed which contain quaternary ammonium salt groups and are produced by copolymerizing a methacrylate-based monomer, an acrylate-based monomer, and an anionic monomer in a certain ratio (Japanese Patent Application Laid-Open Nos. Hei 7-256299 and Hei 7-256300). However, these also do not fully satisfy the demand.

When a crosslinking water-soluble polymer is used as a sludge dewatering agent or a retention aid, such advantages can be obtained that the water content of a dewatered cake can be reduced and good formation can be easily maintained. However, the amount of the polymer added must be increased to achieve the advantages, and this results in an increase in cost.

To solve this problem, a technique has been disclosed in which a crosslinking water-soluble ionic polymer and a linear water-soluble ionic polymer are compounded to exploit the advantages of both the polymers (Japanese Patent Application Laid-Open No. 2004-57837).

However, this technique does not describe the concept that the compounding ratio of the crosslinking water-soluble ionic polymer to the linear water-soluble ionic polymer is changed according to the size distribution of sludge particles.

It is an object of the present invention to develop a flocculant composition applicable to various types of sludge and a method for manufacturing the same. Specifically, the concept of exploiting the advantages of a crosslinking water-soluble ionic polymer and a linear water-soluble polymer is further extended, i.e., the compounding ratio of the crosslinking water-soluble polymer to the linear water-soluble polymer is adjusted according to the size distribution of sludge particles.

DISCLOSURE OF THE INVENTION

To solve the above problems, the present inventors have conducted extensive studies and have completed the invention described below.

A first aspect of the present invention relates to a flocculant composition compounding: a vinyl polymer-type crosslinking water-soluble polymer (A) having a charge inclusion ratio of 20% or more; and a vinyl polymer-type linear water-soluble polymer (B) having a charge inclusion ratio of 5% or more and less than 20%. The inventors have found that this flocculant composition is applicable to various types of sludge.

A flocculant composition according to a second aspect of the present invention is the flocculant composition according to the first aspect of the invention in which a compounding ratio of the vinyl polymer-type crosslinking water-soluble polymer (A) having a charge inclusion ratio of 20% or more to the vinyl polymer-type linear water-soluble polymer (B) having a charge inclusion ratio of 5% or more and less than 20% is changed according to a change in percent by mass of 200-mesh-on particles in sludge based on a total mass of suspended particles in the sludge.

A flocculant composition according to a third aspect of the present invention is the flocculant composition according to the first or second aspect of the invention in which the following relationships are satisfied:

$0.2 \leq a/b \leq 9$ when $0 < X \leq 10$ percent by mass, $0.4 \leq a/b \leq 3$ when $10 < X \leq 20$ percent by mass, and $0.1 \leq a/b \leq 2$ when $20 < X \leq 60$ percent by mass, where X is an amount (percent by mass) of the 200-mesh-on particles in the sludge, a is an amount (percent by mass) of the vinyl polymer-type crosslinking water-soluble polymer (A), and b is an amount (percent by mass) of the vinyl polymer-type linear water-soluble polymer (B).

A flocculant composition according to a fourth aspect of the present invention is the flocculent composition according to any of the first to third aspects of the invention in which the vinyl polymer-type crosslinking water-soluble ionic polymer (A) is obtained by polymerizing a water-soluble monomer mixture of: 5 to 99.9999 percent by mole of a water-soluble monomer represented by the following general formula (1) and/or general formula (2); 0 to 50 percent by mole of a water-soluble monomer represented by the following general formula (3); 0 to 95 percent by mole of a nonionic monomer;

and 0.0001 to 0.1 percent by mole of a water-soluble monomer having a plurality of vinyl groups:

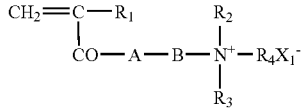

general formula (1)

(wherein: $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion);

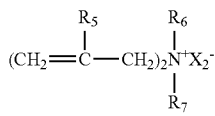

general formula (2)

(wherein: $R_5$ is hydrogen or a methyl group; $R_6$ and $R_7$ each are an alkyl or alkoxy group having 1 to 3 carbon atoms or a benzyl group; and $X_2$ is an anion); and

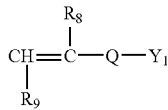

general formula (3)

(wherein: $R_8$ is hydrogen, a methyl group, or $CH_2COOY_2$ (wherein $Y_2$ is hydrogen or a cation); Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation).

A flocculent composition according to a fifth aspect of the present invention is the flocculant composition according to any of the first to third aspects of the invention in which the vinyl polymer-type linear water-soluble ionic polymer (B) is obtained by polymerizing a water-soluble monomer mixture of:

5 to 100 percent by mole of a water-soluble monomer represented by the following general formula (1) and/or general formula (2); 0 to 50 percent by mole of a water-soluble monomer represented by the following general formula (3); and 0 to 95 percent by mole of a nonionic monomer:

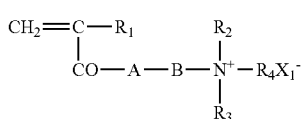

general formula (1)

(wherein: $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion);

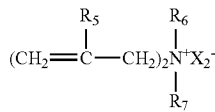

general formula (2)

(wherein: $R_5$ is hydrogen or a methyl group; $R_6$ and $R_7$ each are an alkyl or alkoxy group having 1 to 3 carbon atoms or a benzyl group; and $X_2$ is an anion); and

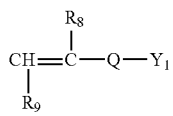

general formula (3)

(wherein: $R_8$ is hydrogen, a methyl group, or $CH_2COOY_2$ (wherein $Y_2$ is hydrogen or a cation); Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation).

A flocculant composition according to a sixth aspect of the invention is the flocculant composition according to any of the first to third aspects of the invention in which one of the vinyl polymer-type crosslinking water-soluble ionic polymer (A) and the vinyl polymer-type linear water-soluble ionic polymer (B) is a water-in-oil emulsion produced by: emulsifying the monomers or the monomer mixture and an organic liquid immiscible with water using a high-HLB (hydrophile-lypophile balance) surfactant such that the organic liquid forms a continuous phase and an aqueous solution of the water-soluble monomers forms a disperse phase; and polymerizing the monomers.

A method for manufacturing a flocculant composition according to a seventh aspect of the invention is characterized by compounding a vinyl polymer-type crosslinking water-soluble polymer (A) having a charge inclusion ratio of 20% or more; and a vinyl polymer-type linear water-soluble polymer (B) having a charge inclusion ratio of 5% or more and less than 20%.

A method for manufacturing a flocculant composition according to an eighth aspect of the invention is the method for manufacturing a flocculant composition according to the seventh aspect of the invention in which the flocculant composition is configured such that a compounding ratio of the vinyl polymer-type crosslinking water-soluble polymer (A) having a charge inclusion ratio of 20% or more to the vinyl polymer-type linear water-soluble polymer (B) having a charge inclusion ratio of 5% or more and less than 20% is changed according to a change in percent by mass of 200-mesh-on particles in sludge based on a total mass of suspended particles in the sludge.

A method for manufacturing a flocculant composition according to a ninth aspect of the invention is the method for manufacturing a flocculant composition according to the seventh or eighth aspect of the invention in which the vinyl polymer-type crosslinking water-soluble ionic polymer (A) is obtained by polymerizing a water-soluble monomer mixture of: 5 to 99.9999 percent by mole of a water-soluble monomer represented by the following general formula (1) and/or general formula (2); 0 to 50 percent by mole of a water-soluble monomer represented by the following general formula (3); 0 to 95 percent by mole of a nonionic monomer; and 0.0001 to 0.1 percent by mole of a water-soluble monomer having a plurality of vinyl groups:

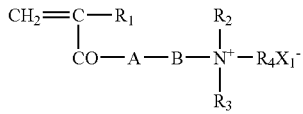

general formula (1)

(wherein: $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion);

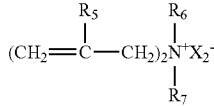

general formula (2)

(wherein: $R_5$ is hydrogen or a methyl group; $R_6$ and $R_7$ each are an alkyl or alkoxy group having 1 to 3 carbon atoms or a benzyl group; and $X_2$ is an anion); and

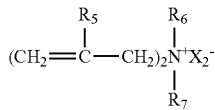

general formula (3)

(wherein: $R_8$ is hydrogen, a methyl group, or $CH_2COOY_2$ (wherein $Y_2$ is hydrogen or a cation); Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation).

A method for manufacturing a flocculant composition according to a tenth aspect of the invention is the method for manufacturing a flocculant composition according to the seventh or eighth aspect of the invention in which the vinyl polymer-type linear water-soluble ionic polymer (B) is obtained by polymerizing a water-soluble monomer mixture of: 5 to 100 percent by mole of a water-soluble monomer represented by the following general formula (1) and/or general formula (2); 0 to 50 percent by mole of a water-soluble monomer represented by the following general formula (3); and 0 to 95 percent by mole of a nonionic monomer:

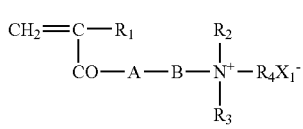

general formula (1)

(wherein: $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion);

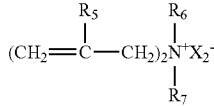

general formula (2)

(wherein: $R_5$ is hydrogen or a methyl group; $R_6$ and $R_7$ each are an alkyl or alkoxy group having 1 to 3 carbon atoms or a benzyl group; and $X_2$ is an anion); and

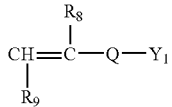

general formula (3)

(wherein: $R_8$ is hydrogen, a methyl group, or $CH_2COOY_2$ (wherein $Y_2$ is hydrogen or a cation); Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation).

A method for manufacturing a flocculant composition according to an eleventh aspect of the invention is the method for manufacturing a flocculant composition according to any of the seventh to tenth aspects of the invention in which one of the vinyl polymer-type crosslinking water-soluble ionic polymer (A) and the vinyl polymer-type linear water-soluble ionic polymer (B) is a water-in-oil emulsion produced by: emulsifying the monomers or the monomer mixture in an organic liquid immiscible with water using a high-HLB (hydrophile-lypophile balance) surfactant such that the organic liquid forms a continuous phase and an aqueous solution of the water-soluble monomers forms a disperse phase; and polymerizing the monomers.

Hereinafter, the present invention will be described in detail.

The extension of water-soluble polymer molecules in water is suppressed by crosslinking. Therefore, the polymer molecules are present in "densely packed" molecular form and form water-swellable fine particles as the crosslinking proceeds. Generally, polymer molecules in the "densely packed" molecular form described above are used as a polymer flocculant, and it is effective that the polymer molecules are water-soluble.

When added to sludge, a crosslinking water-soluble polymer is adsorbed by suspended particles and acts as a bonding agent for the particles, and this results in the flocculation of the particles. Since the polymer molecules are in "densely packed" molecular form, it is presumed that the polymer molecules are bonded to the surfaces of the particles at multi-points, so that densely packed and high strength flocs are formed.

Multi-point bonding provides good adherability onto suspended particles. Therefore, the amount of non-adsorbed water-soluble polymer is low, and the polymer molecules are not liberated into sludge, so that the viscosity of the sludge does not increase. This may provide good drainage during mechanical dewatering to allow a reduction in the water content of a cake.

Moreover, when a polymer flocculant used is amphoteric, ionic bonding between the polymer flocculant molecules or ionic bonding between the cationic and anionic groups of the polymer flocculant molecules adsorbed on the surfaces of the suspended particles also occurs, so that the charge is neutralized. In other words, the charge state approaches zero. Therefore, the optimal range of the added amount of the flocculant is extended, and the amount of the flocculant to be added can be easily adjusted.

When a cationic polymer flocculent is used, adsorption, flocculation, and the like may occur through the same mechanisms as above. However, charge neutralization due to ionic bonding between cationic and anionic groups does not occur. Therefore, when an excessive amount of the flocculant is added, redispersion is likely to occur, and the optimal range of the added amount of the cationic polymer flocculant is narrower than that of the amphoteric polymer flocculant.

However, when flocculent molecules are present in "densely packed" molecular form, the extension of the molecules is small, and therefore the added amount of the flocculant increases. This is disadvantageous in terms of cost. Therefore, in the present invention, a linear polymer having a charge inclusion ratio of less than 20% is compounded to prevent an increase in the added amount of the flocculant.

The extension of linear polymer molecules is large, and the crosslinking-adsorption action thereof is high. Therefore, with a linear polymer, large flocs are easily formed. However, due to their large size, the flocs are easily destroyed by stirring and are likely to capture water during flocculation, so that dewatering properties deteriorate. In particular, when such a linear polymer is used for sludge containing a small amount of fiber, such as excess sludge, flocculated flocs that can be mechanically dewatered are difficult to form.

To achieve a good flocculated state for various types of sludge, it is important to compound both a crosslinking water-soluble polymer and a linear polymer, as described above.

In the present invention, for cationic crosslinking water-soluble ionic polymers and for amphoteric crosslinking water-soluble ionic polymers in which the difference between the molar concentration of cationic monomers and that of anionic monomers is positive, the charge inclusion ratio is computed using the following equation 1:

$$\text{Charge inclusion ratio [\%]}=(1-\alpha/\beta)\times 100. \quad (1)$$

In the equation 1, $\alpha$ is a titer determined as follows. The pH of a 0.01% aqueous solution of a crosslinking water-soluble ionic polymer is adjusted to 4 with acetic acid. Then, this solution is titrated with a titrant (a $\frac{1}{1000}$N aqueous solution of potassium polyvinyl sulfonate) using a PCD titration apparatus (Mutek PCD 03, Mutek PCD-Two Titrator Version 2, product of Mutek) (titration rate: 0.05 mL/10 sec, end point determination: 0 mV).

$\beta$ is a value determined as follows. The pH of a 0.01% aqueous solution of the crosslinking water-soluble ionic polymer is adjusted to 4 with acetic acid, and a $\frac{1}{400}$N aqueous solution of potassium polyvinyl sulfonate is added thereto in an amount sufficient to neutralize the charge. The mixture is well stirred and is then titrated with a titrant (a $\frac{1}{1000}$N aqueous solution of diallyldimethyl ammonium chloride) using the PCD titration apparatus in the same manner as above (titration rate: 0.05 mL/10 sec, end point determination: 0 mV) to thereby determine the titer. The value of $\beta$ is computed by subtracting the determined titer from a blank value.

The blank value is a titer determined as follows. An aqueous solution of potassium polyvinyl sulfonate is prepared such that its concentration is the same as that of the above sample having a pH of 4.0 adjusted with acetic acid. Then, the prepared aqueous solution is titrated with a titrant (a $\frac{1}{1000}$N aqueous solution of diallyldimethyl ammonium chloride) using the PCD titration apparatus in the same manner as above (titration rate: 0.05 mL/10 sec, end point determination: 0 mV).

In the present invention, for anionic crosslinking water-soluble ionic polymers and for amphoteric crosslinking water-soluble ionic polymers in which the difference between the molar concentration of cationic monomers and that of anionic monomers is negative, the charge inclusion ratio is computed using the following equation 2:

$$\text{Charge inclusion ratio [\%]}=(1-\alpha/\beta)\times 100. \quad (2)$$

In the equation 2, $\alpha$ is a titer determined as follows. The pH of a 0.01% aqueous solution of a crosslinking water-soluble ionic polymer is adjusted to 10.0 with ammonia. Then, this solution is titrated with a titrant (a $\frac{1}{1000}$N aqueous solution of diallyldimethyl ammonium chloride) using the PCD titration apparatus (Mutek PCD 03, Mutek PCD-Two Titrator Version 2, product of Mutek) (titration rate: 0.05 mL/10 sec, end point determination: 0 mV).

$\beta$ is a value determined as follows. The pH of a 0.01% aqueous solution of the crosslinking water-soluble ionic polymer is adjusted to 10.0 with ammonia, and a $\frac{1}{400}$N aqueous solution of diallyldimethyl ammonium chloride is added thereto in an amount sufficient to neutralize the charge. The mixture is well stirred and is then titrated with a titrant (a $\frac{1}{1000}$N aqueous solution of potassium polyvinyl sulfonate) using the PCD titration apparatus in the same manner as above (titration rate: 0.05 mL/10 sec, end point determination: 0 mV) to thereby determine the titer. The value of $\beta$ is computed by subtracting the determined titer from a blank value.

The blank value is a titer determined as follows. An aqueous solution of diallyldimethyl ammonium chloride is prepared such that its concentration is the same as that of the above sample having a pH of 10.0 adjusted with ammonia. Then, the prepared aqueous solution is titrated with a titrant (a $\frac{1}{1000}$N aqueous solution of potassium polyvinyl sulfonate) using the PCD titration apparatus in the same manner as above (titration rate: 0.05 mL/10 sec, end point determination: 0 mV).

In the concept of the charge inclusion ratio used in the present invention, the degree of crosslinking of a polymer is not accurately represented by the value of the charge inclusion ratio. However, this value is used as a relative measure for determining whether the degree of crosslinking of a polymer is high or low.

Specifically, when the charge inclusion ratio of a polymer produced by polymerizing monomers in the presence of a water-soluble monomer having a plurality of vinyl groups is 20% or more and less than 80%, this charge inclusion ratio can represent the degree of crosslinking of a cationic water-soluble crosslinking polymer. When the charge inclusion ratio of the above polymer is less than 20, the degree of crosslinking of the polymer is low, or the polymer is a linear polymer.

When the vinyl polymer-type crosslinking water-soluble polymer (A) having a charge inclusion ratio of 20% or more is prepared by copolymerizing an increased amount of the monomer having a plurality of vinyl groups, the charge inclusion rate of the obtained polymer tends to increase. Therefore, a polymer (A) having a desired charge inclusion ratio can be produced by appropriately changing the types, amounts, and the like of the other monomers. The vinyl polymer-type linear water-soluble polymer (B) having a charge inclusion ratio of less than 20% is produced by copolymerization without using a water-soluble monomer having a plurality of vinyl groups, as described later.

When dewatered, sludge is flocculated to form flocs, so that passages for water are formed. A similar process must be used in any dewatering apparatus.

Generally, sludge is a mixture of fibers and fine colloidal particles. However, the ratio of the fibers to particles is different depending on the type of sludge. For example, the ratio of fine colloidal particles is high in excess sludge generated when paper making wastewater, chemical industry wastewater, food industry wastewater, municipal wastewater, and the like are biologically treated. The ratio of fibers and large particles is high in raw sludge from municipal wastewater and paper making sludge.

Therefore, when the polymer flocculant is used, it is preferable to compound the crosslinking polymer and the linear polymer in a manner described below.

Hereinafter, the size distribution of sludge particles and the compounding of the crosslinking polymer and the linear polymer are described.

In the present invention, the formation of flocs by the crosslinking-adsorption action of the linear polymer is referred to as flocculation, and the formation of fine flocs by the neutralization action mainly on the surface charges of hydrophilic particles such as colloidal particles is referred to as coagulation.

When, as in digested sludge and excess sludge, the amount of fibers is small and the amount of small particles is large, a large proportion of particles is highly anionic colloidal particles and is stably dispersed. Therefore, the flocculation by the crosslinking-adsorption action of the linear polymer tends not to occur. In other words, hydrophobicity is not imparted to the particles, and therefore the particles remain dispersed, so that the formation of flocs may not occur.

Meanwhile, the crosslinking polymer is in more densely packed form than the linear polymer. Therefore, the surface charge of colloidal particles can be neutralized, and the crosslinking polymer itself can serve as the core of coagulation.

This results in the formation of densely packed flocs which have a high tolerance to agitation, and therefore dewatering by a dewatering apparatus is efficiently carried out. Moreover, as a result of neutralization of the surface charge, hydrophobicity is imparted to the colloidal particles, and therefore favorable conditions for reducing the water content are obtained. Accordingly, the crosslinking polymer may be suitable for sludge containing a large number of small particles.

However, in sludge containing a large amount of fibers and a large number of rough particles, flocculation by the linear polymer due to the crosslinking-adsorption action of the linear polymer tends to occur.

Since actual sludge contains both types of particles, it is very important to use a composition of the crosslinking polymer and the linear polymer.

The amount (percent by mass) of 200-mesh-on particles in food excess sludge can be, for example, 0.56, and that in wastewater excess sludge can be, for example, 5.4%. For such sludge, the compounding mass ratio of the crosslinking polymer to the linear polymer is preferably 3:10 to 9:1.

Specifically, let the amount (percent by mass) of 200-mesh-on particles in sludge be X, the amount (percent by mass) of the above-mentioned vinyl polymer-type crosslinking water-soluble polymer (A) be a, and the amount (percent by mass) of the above-mentioned vinyl polymer-type linear water-soluble polymer (B) be b. Then, the relationship among X, a, and b is $0.2 \leq a/b \leq 9$ when $0 < x \leq 10$, and preferably $2 \leq a/b \leq 9$.

In wastewater mixed raw sludge, the amount (percent by mass) of 200-mesh-on particles can be, for example, 17.9%. In this case, the compounding mass ratio of the crosslinking polymer to the linear polymer is 1:5 to 3:1. Specifically, when $10 < x \leq 20$, $0.4 \leq a/b \leq 3$, and preferably $1 \leq a/b \leq 3$.

In meet processing wastewater sludge, the amount (percent by mass) of 200-mesh-on particles can be, for example, 29.8%. In such sludge, the compounding mass ratio of the crosslinking polymer to the linear polymer is 1:10 to 2:1. Specifically, when $20 < x \leq 60$, $0.1 \leq a/b \leq 2$, and preferably $0.2 \leq a/b \leq 1$.

Generally, the flocculant composition of the present invention is dissolved at a flocculant concentration of 0.1 to 0.5 percent by mass. The added amount is 0.1 to 1.5 percent by mass and preferably 0.2 to 1.0 percent by mass based on the solids content of sludge.

The basic concept of the flocculant composition of the present invention is to change the compounding ratio of the crosslinking polymer to the linear polymer. In addition to this, the adaptability to changes in sludge characteristics can be improved by changing the molecular weights and ion equivalents of both the crosslinking polymer and the linear polymer.

Specifically, for centrifugal dehydrators, the molecular weight of the linear polymer may be increased. For vacuum dehydrators, the molecular weight of the linear polymer is decreased, and the cation equivalents of both the crosslinking polymer and the linear polymer may be set to large values.

When the dissolved amount of an anionic colloidal material is large, the cation equivalents of both the crosslinking polymer and the linear polymer are set to large values as in the above case. Moreover, fine adjustments such as improvement in the stability of an aqueous solution of the flocculent can be made by adding an acid or the like in response to the alkalinity of water used for dissolution.

The method for manufacturing a flocculent composition according to the present invention has a great advantage in that a facility similar to a manufacturing plant of the polymer flocculant can be built by simply constructing a supply base for the flocculant composition at any location (e.g., a domestic or foreign location) without building a new manufacturing plant of the polymer flocculant.

Several raw material tanks for the components of the flocculant composition to be mixed such as the crosslinking polymer, linear polymer, polymers having different molecular weights, and polymers having different ion equivalents, a mixing tank for mixing the components, tanks for other additives, a tank for the flocculant composition after mixing, and the like are installed in the supply base for the flocculant composition. Raw flocculants are transported to the base from plants that manufacture the polymer flocculants. In this manner, flocculant compositions that can be used for various types of sludge can be sold and supplied to all over the world.

The crosslinking ionic water-soluble polymer (A) used in the present invention can be produced by copolymerizing a water-soluble monomer mixture of: 5 to 99.9999 percent by mole, preferably 20 to 99.9999 percent by mole, of the monomer represented by the general formula (1) and/or general formula (2) described above; 0 to 50 percent by mole, preferably 0 to 35 percent by mole, of the monomer represented by general formula (3) described above; 0 to 95 percent by mole, preferably 0 to 80 percent by mole, of a nonionic monomer; and 0.0001 to 0.1 percent by mole of a water-soluble monomer having a plurality of vinyl groups.

When the cationic or amphoteric crosslinking water-soluble polymer (A) used in the present invention is produced, the ionic monomers described above are used. Of these, the cationic monomer represented by the general formula (1) is described below by way of examples.

Examples include dimethylaminoethyl (meth)acrylate, dimethylaminopropyl (meth)acrylamide, and methyldiallylamine. Examples of the quaternary ammonium group-containing monomer include quaternized products of the above tertiary amino group-containing monomers with methyl chloride or benzyl chloride, such as (meth)acryloyloxyethyltrimethylammonium chloride, (meth)acryloyloxy 2-hydroxypropyltrimethylammonium chloride, (meth) acryloylaminopropyltrimethylammonium chloride, (meth) acryloyloxyethyldimethylbenzylammonium chloride, (meth) acryloyloxy 2-hydroxypropyldimethylbenzylammonium chloride, and (meth)acryloylaminopropyldimethylbenzylammonium chloride. Examples of the monomer represented by the general formula (2) include diallyldimethylammonium chloride, diallyldiethylammonium chloride, and diallylbenzylmethylammonium chloride.

As the anionic monomer used when the amphoteric crosslinking water-soluble polymer (A) used in the present invention is produced, a sulfonic group-containing monomer or a carboxyl group-containing monomer may be used, and a combination thereof may also be used. Examples of the sulfonic group-containing monomer include vinylsulfonic acid, vinylbenzenesulfonic acid, and 2-acrylamido 2-methylpropanesulfonic acid. Examples of the carboxyl group-containing monomer include methacrylic acid, acrylic acid, itaconic acid, maleic acid, and p-carboxystyrene.

Examples of the nonionic monomer to be copolymerized include (meth) acrylamide, N,N-dimethylacrylamide, vinyl acetate, acrylonitrile, methyl acrylate, 2-hydroxyethyl (meth) acrylate, diacetone acrylamide, N-vinylpyrrolidone, N-vinylformamide, N-vinylacetamide, acryloylmorpholine, and acryloylpiperazine.

Examples of the monomer having a plurality of vinyl groups that is used in the present invention include methylenebisacrylamide and ethylene glycol di(meth)acrylate. A thermally crosslinkable monomer such as N,N-dimethyl acrylamide may also be used.

The amount of the monomer having a plurality of vinyl groups or the thermally crosslinkable monomer added to the ionic monomers or the ionic and nonionic monomers is normally 0.0001 to 0.1 percent by mole and preferably 0.0005 to 0.01 percent by mole based on the monomer mixture.

To adjust the degree of polymerization, it is effective to use a chain transfer agent such as isopropyl alcohol in an amount of 0.01 to 3 percent by mass based on the monomers.

The vinyl polymer-type linear water-soluble ionic polymer (B) having a charge inclusion ratio of 5% or more and less than 20% is produced by copolymerizing the monomers including the ionic monomers represented by the general formulas (1) to (3) and the nonionic monomer or a water-soluble monomer mixture thereof in the absence of the monomer having a plurality of vinyl groups.

The vinyl polymer-type crosslinking water-soluble ionic polymer (A) having a charge inclusion ratio of 20% or more and the vinyl polymer-type linear water-soluble ionic polymer (B) having a charge inclusion ratio of 5% or more and less than 20%, which are used in the present invention, can be produced by compounding products in any form. However, in terms of ease of mixing, it is preferable to use a water-in-oil polymer emulsion.

Such a water-in-oil polymer emulsion can be produced by the method described below. Ionic monomers or a water-soluble monomer mixture of ionic monomers and copolymerizable monomers is mixed with water, an oily material composed of at least hydrocarbon immiscible with water, and at least one surfactant having an HLB value and in an amount sufficient to form a water-in-oil emulsion. The mixture is vigorously stirred to form the water-in-oil emulsion and is subjected to polymerization, whereby the polymer is synthesized.

Examples of the oily hydrocarbon material used as a dispersion medium include paraffins, mineral oils such as kerosene, light oil, and middle oil, hydrocarbon-based synthetic oils having characteristics, such as boiling point and viscosity, in substantially the same range as those of the above oils, and mixtures thereof. The amount of the oily hydrocarbon material is 20 percent by mass to 50 percent by mass, and preferably 20 percent by mass to 35 percent by mass, based on the total mass of the water-in-oil emulsion.

Examples of the at least one surfactant having an HLB value and in an amount sufficient to form the water-in-oil emulsion include nonionic surfactants having an HLB of 3 to 11, and specific examples include sorbitan monooleate, sorbitan monostearate, and sorbitan monopalmitate. The amount of the surfactant is 0.5 to 10 percent by mass, and preferably 1 to 5 percent by mass, based on the total mass of the water-in-oil emulsion.

After polymerization, a hydrophilic surfactant referred to as a phase inversion agent is added to allow the emulsion particles covered with oil film to be hydrophilic so that the water-soluble polymer in the particles is easily dissolved in water. When used, the resultant emulsion is diluted with water.

Examples of the hydrophilic surfactant include cationic surfactants and nonionic surfactants having an HLB of 9 to 15, such as polyoxyethylene polyoxypropylene alkyl ether-based surfactants and polyoxyethylene alcohol ether based-surfactants.

Generally, the polymerization conditions are appropriately determined according to the monomers used and the amount (percent by mole) for copolymerization, and the temperature is in the range of 0 to 100° C.

In particular, when the water-in-oil emulsion polymerization method is used, the temperature is 20 to 80° C., and preferably 20 to 60° C.

A radical polymerization initiator is used to initiate polymerization. The initiator may be oil-soluble or water-soluble, and any of azo-based initiators, peroxide-based initiators, and redox-based initiators can be used to initiate polymerization.

Examples of the oil-soluble azo-based initiator include 2,2'-azobisisobutyronitrile, 1,1'-azobis(cyclohexanecarbonitrile), 2,2'-azobis(2-methylbutyronitrile), 2,2'-azobis(2-methylpropionate), and 4,4-azobis(4-methoxy-2,4-dimethyl) valeronitrile.

Examples of the water-soluble azo-based initiator include 2,2'-azobis(amidinopropane)dihydrochloride, 2,2'-azobis[2-(5-methyl-2-imidazoline-2-yl)propane]dihydrochloride, and 4,4'-azobis(4-cyanovaleric acid).

Examples of the redox-based initiator include combinations of ammonium peroxodisulfate with sodium sulfite, sodium hydrogen sulfite, trimethylamine, tetramethylethylenediamine, and the like.

Examples of the peroxide include ammonium peroxodisulfate, potassium peroxodisulfate, hydrogen peroxide, benzoyl peroxide, lauroyl peroxide, octanoyl peroxide, succinic peroxide, and t-butyl peroxy 2-ethyl hexanoate.

The polymerization concentration of the monomers is 20 to 50 percent by mass, and preferably 25 to 40 percent by mass, and the polymerization concentration and temperature are appropriately set according to the compositions of the monomers, the polymerization method, and the selected initiator.

The molecular weight of the water-soluble polymer obtained by polymerizing the above monomers is preferably 3,000,000 to 20,000,000.

BEST MODE FOR CARRYING OUT THE INVENTION

Hereinafter, the present invention will be described in more detail by way of Examples and Comparative examples. However, the invention is not limited to the following Examples, unless the gist of the invention is altered.

Synthetic Example 1

A reaction vessel equipped with a stirrer and a temperature controller was charged with 130 g of isoparaffin having a boiling point of 190° C. to 230° C. and 5.0 g of sorbitan monooleate, and the mixture was dissolved. Separately, 216.7 g of an 80% aqueous solution of acryloyloxyethyltrimethylammonium chloride (hereinafter abbreviated as DMQ), 54.5 g of a 50% aqueous solution of acrylamide (abbreviated as AAM), 2.4 g of a 0.1% aqueous solution of methylenebisacrylamide, 0.2 g of isopropyl alcohol (0.1 percent by mass based on the total mass of monomers), and 83.2 g of ion exchanged water were weighed, mixed, and dissolved thoroughly. Subsequently, the oil and the aqueous solution were mixed, and the mixture was stirred and emulsified in a homogenizer at 1,000 rpm for 15 minutes. At this time, the monomer composition was DMQ/AAM=70/30 (percent by mole).

While the temperature of the monomer solution was held at 25 to 27° C., the obtained emulsion was subjected to nitrogen substitution for 30 minutes. Subsequently, 0.02 g of 4,4-azobis 4-methoxy 2,4-dimethyl valeronitrile (V-70, product of Wako Pure Chemical Industries, Ltd., 0.01 percent by mass based on the total mass of monomers) was added to initiate the polymerization reaction. The polymerization was conducted at 25±2° C. for 12 hours, and the reaction was completed.

After the polymerization, 5.0 g (1 percent by mass based on the mass of the solution) of polyoxyethylene polyoxypropylene alkyl ether serving as a phase inversion agent was added to and mixed with the produced water-in-oil emulsion.

Subsequently, the viscosity of the product was measured using a B-type viscometer and was 331 mPa·s. The charge inclusion ratio was determined using a colloidal titration method and the equation described above and was 52.5%. The obtained product is referred to as sample-1. The results are shown in Table 1.

Synthetic Example 2

Sample-2 (DMQ/AAM=70/30 (percent by mole), charge inclusion ratio: 29.1%), sample-3 (DMQ/AAM=70/30 (percent by mole), charge inclusion ratio: 11.3%), sample-4 (DMQ/AAM/AAC=60/25/15 (percent by mole), charge inclusion ratio: 42.0%), and sample-5 (DMQ/AAM/AAC=60/25/15, (percent by mole), charge inclusion ratio: 10.2%) were synthesized in a manner similar to that in Synthetic Example 1. The results are shown in Table 1.

Synthetic Example 3

A five-necked separable flask equipped with a stirrer, a thermometer, a reflux condenser, and a nitrogen inlet tube was charged with 105.5 g of ion exchanged water, 52.5 g (7.0% based on monomers) of a homopolymer of acryloyloxyethyltrimethylammonium chloride (a 20% aqueous solution, molecular weight: 1,200,000) serving as a dispersing agent, 125.0 g of ammonium sulfate, 40.8 g of a 50% aqueous solution of acrylamide, 162.6 g of an 80% aqueous solution of acryloyloxyethyltrimethylammonium chloride, 2.4 g of a 0.1% aqueous solution of methylenebisacrylamide, and 0.2 g of isopropyl alcohol (0.1 percent by mass based on the total mass of monomers), and the components were thoroughly dissolved.

After nitrogen substitution for 30 minutes while the inside temperature was held at 25 to 27° C., 1.5 g (0.01% based on monomers) of a 1% aqueous solution of 2,2'-azobis[2-(5-methyl-2-imidazoline-2-yl)propane]dihydrochloride serving as an initiator was added to initiate polymerization. At 1 hour after initiation, a slight increase in viscosity of the reaction product was observed, and this state continued for 25 minutes. Then, the viscosity increase subsided rapidly, and a dispersion was obtained. At 6 hours after initiation, 1.0 g of the above initiator solution was added, and the polymerization was further continued for 8 hours.

The concentration of the charged monomers in the obtained dispersion was 20%. The polymer particle size was 5 μm or less, and the viscosity of the dispersion was measured using a B-type viscometer and was 735 mPa·s.

The weight average molecular weight was measured by the static light scattering method using a molecular weight measuring apparatus (DLS-7000, product of Otsuka Electronics Co., Ltd.). The charge inclusion ratio was determined using a colloidal titration method and the equation described above and was 65.3%. This sample is referred to as sample-6. The same procedure as above was repeated except that methylenebisacrylamide was not added, whereby sample-7 was synthesized. The results are shown in Table 1.

TABLE 1

| Sample name | DMQ | AAM | AAC | Added amount of crosslinkable monomer | Form of product | Viscosity of product | Molecular weight | Charge inclusion ratio |
|---|---|---|---|---|---|---|---|---|
| Sample-1 | 70 | 30 |  | 0.0012 | EM | 331 | 900 | 52.5 |
| Sample-2 | 70 | 30 |  | 0.0007 | EM | 283 | 830 | 29.1 |
| Sample-3 | 70 | 30 |  | 0 | EM | 310 | 740 | 11.3 |
| Sample-4 | 60 | 25 | 15 | 0.0012 | EM | 250 | 760 | 42.0 |
| Sample-5 | 60 | 25 | 15 | 0 | EM | 315 | 710 | 10.2 |

TABLE 1-continued

| Sample name | DMQ | AAM | AAC | Added amount of crosslinkable monomer | Form of product | Viscosity of product | Molecular weight | Charge inclusion ratio |
|---|---|---|---|---|---|---|---|---|
| Sample-6 | 70 | 30 | | 0.0012 | Dispersion | 735 | 790 | 65.3 |
| Sample-7 | 70 | 30 | | 0 | Dispersion | 700 | 650 | 7.7 |

DMQ: Acryloyloxyethyltrimethylammonium chloride
AAM: Acrylamide
AAC: Acrylic acid
Viscosity of emulsion: mPa · s
Added amount of crosslinkable monomer: percent by mass based on total mass of monomers
Charge inclusion ratio: %
EM: Water-in-oil emulsion
Dispersion: dispersion in brine

INDUSTRIAL APPLICABILITY

In the composition according to the present invention, the advantages of a crosslinking water-soluble polymer and a linear water-soluble polymer are exploited. The compounding ratio of the crosslinking water-soluble polymer to the linear water-soluble polymer is changed according to the form of the size distribution of sludge particles. In this manner, an excellent ability to adhere to suspended particles is obtained, and an increase in viscosity of sludge is prevented. In addition, good drainage during mechanical dewatering is obtained, so that the water content of a cake can be reduced. The composition is applicable to various types of sludge. Therefore, the composition can be used as a flocculant for various types of sludge.

Example 1

Preparation of Flocculant Compositions

Flocculant compositions each containing a vinyl polymer-type crosslinking water-soluble polymer (crosslinking product) and a vinyl polymer-type linear water-soluble polymer (linear product) in a compounding ratio shown in Table 2 were produced. Each of the flocculant compositions was produced as a water-in-oil emulsion or a dispersion in brine.

The results are shown in Table 2.

TABLE 2

| Composition name | Sample name (linear product) | Sample name (crosslinking product) | Compounding ratio linear product/ crosslinking product | Form of product |
|---|---|---|---|---|
| Composition-1 | Sample-3 | Sample-1 | 3:7 | Emulsion |
| Composition-2 | Sample-3 | Sample-2 | 3:7 | Emulsion |
| Composition-3 | Sample-3 | Sample-4 | 3:7 | Emulsion |
| Composition-4 | Sample-5 | Sample-4 | 3:7 | Emulsion |
| Composition-5 | Sample-3 | Sample-1 | 7:3 | Emulsion |
| Composition-6 | Sample-5 | Sample-4 | 7:3 | Emulsion |
| Composition-7 | Sample-3 | Sample-1 | 5:5 | Emulsion |
| Composition-8 | Sample-7 | Sample-6 | 7:3 | Dispersion in brine |
| Composition-9 | Sample-7 | Sample-6 | 3:7 | Dispersion in brine |

Compounding ratio: mass ratio

Example 2

A flocculation-filtration test and a compression test were performed on excess sludge produced in a sewage-treatment plant (sludge properties: pH: 6.6, SS: 8,250 mg/L, TS: 8,500 mg/L) on the assumption that the sludge was treated in a centrifugal dehydrator.

The amount of 200-mesh-on residues of this sludge was 1.3 percent by mass, and the amount of organic components in the sludge was 86.4 percent by mass based on the mass of the SS. The ratio of the organic components was large, and the size of the sludge particles was small. Therefore, the dewaterability of the sludge was low.

A 200 mL portion of the sludge was placed in a 300 mL polypropylene beaker. Subsequently, a solution of one of the composition-1 (Example 2-1), composition-2 (Example 2-2), composition-3 (Example 2-3), composition-4 (Example 2-4), and composition-9 (Example 2-5) shown in Table 2 (in these samples, crosslinking water-soluble polymer:linear water-soluble polymer=7:3) was added to the sludge. The mixture was stirred at 1,000 rpm for 30 seconds to flocculate the sludge.

Subsequently, the size of the flocs was observed, and the filtration rate was examined using a beaker with filter cloth of 60 mesh. After filtration, the flocculate was pressed and dewatered at a compression pressure of 1 kgf/cm$^2$ for 30 seconds, and then the water content of the dewatered cake was determined.

The results are shown in Table 3.

(Comparative Test 1)

The tests were performed on the sample-1 (Comparative Test 1-1), sample-2 (Comparative Test 1-2) (these are crosslinking water-soluble polymers), sample 3 (Comparative Test 1-3) (linear water-soluble polymer), sample-4 (Comparative Test 1-4) (crosslinking water-soluble polymer), and sample-5 (Comparative Test 1-5) (linear water-soluble polymer) shown in Table 1.

The results are shown in Table 3.

The amount of 200-mesh-on residues of the sludge used was 1.3 percent by mass, and the sludge contained a large number of small particles. Therefore, good results were obtained in Examples 2-1 to 2-5 in which one of the compositions-1 to -4 and -9 (crosslinking water-soluble polymer: linear water-soluble polymer=7:3) was used.

However, in the sample-3 (Comparative Test 1-3) and the (Comparative Test 1-5) in which a linear water-soluble polymer alone was used, the flocculation effects were low. In the sample-4 (Comparative Test 1-4) in which a crosslinking water-soluble polymer alone was used, the flocculation effects were observed but were lower than those of the flocculant compositions of Example 1.

TABLE 3

| Sample name | Added amount | Floc diameter | Filtration amount (time) 5 seconds | Filtration amount (time) 20 seconds | Water content |
|---|---|---|---|---|---|
| Example 2 | | | | | |
| 2-1 | Composition-1 | 300 | 7 | 131 | 158 | 73.8 |
| 2-2 | Composition-2 | 300 | 6 | 122 | 154 | 74.2 |
| 2-3 | Composition-3 | 300 | 7 | 132 | 156 | 73.4 |
| 2-4 | Composition-4 | 300 | 7 | 136 | 152 | 73.6 |
| 2-5 | Composition-9 | 300 | 6 | 124 | 158 | 74.5 |
| Comparative Test 1 | | | | | |
| 1-1 | Sample-1 | 300 | 6 | 117 | 155 | 75.5 |
| 1-2 | Sample-2 | 300 | 4 | 110 | 154 | 75.9 |
| 1-3 | Sample-3 | 300 | 2 | 98 | 155 | 77.8 |
| 1-4 | Sample-4 | 300 | 6 | 120 | 155 | 75.3 |
| 1-5 | Sample-5 | 300 | 3 | 105 | 153 | 77.5 |

Floc diameter: mm
Filtration amount: mL
Water content: percent by weight
Added amount: amount added to sludge dispersion Example 3

A flocculation-filtration test and a compression test were performed on excess sludge produced in a meat processing plant (sludge properties: pH:6.2, SS: 17,300 mg/L, TS: 19,000 mg/L) on the assumption that the sludge was treated in a centrifugal dehydrator.

The amount of 200-mesh-on residues of this sludge was 29.8 percent by mass. A 200 mL portion of the sludge was placed in a 300 mL polypropylene beaker. Subsequently, a solution of one of the composition-5 (Example 3-1), composition-6 (Example 3-2), composition-8 (Example 3-4) (in these samples, crosslinking water-soluble polymer:linear water-soluble polymer=3:7), and composition-7 (Example 3-3) (crosslinking water-soluble polymer:linear water-soluble polymer=5:5) was added to the sludge. The mixture was stirred at 1,000 rpm for 30 seconds to flocculate the sludge.

Subsequently, the size of the flocs was observed, and the filtration rate was examined using a beaker with filter cloth of 60 mesh. After filtration, the flocculate was pressed and dewatered at a compression pressure of 1 kgf/cm² for 30 seconds, and then the water content of the dewatered cake was determined.

The results are shown in Table 4.

(Comparative Test 2)

The tests were performed on the sample-1 (Comparative Test 2-1), sample-2 (Comparative Test 2-2) (these are crosslinking water-soluble polymers), sample-3 (Comparative Test 2-3) (linear water-soluble polymer), sample-4 (Comparative Test 2-4) (crosslinking water-soluble polymer), and sample-5 (Comparative Test 2-5) (linear water-soluble polymer) shown in Table 1.

The results are shown in Table 4.

The amount of 200-mesh-on residues of the sludge used was 29.8 percent by mass, and the sludge contained a large number of large particles. Therefore, good results were obtained in Examples 3-1 to 3-4 in which one of compositions-5, -6, and -8 (crosslinking water-soluble polymer:linear water-soluble polymer=3:7) was used. In Example 3-3 in which the composition-7 (crosslinking water-soluble polymer:linear water-soluble polymer=5:5) was used, although the effects were slightly reduced, good results were obtained.

In the sample-3 (Comparative Test 2-3) and sample-5 (Comparative Test 2-5) in which a linear water-soluble polymer alone was used, the flocculation effects were lower than those of the compositions. In the sample-1 (Comparative Test 2-1), sample-2 (Comparative Test 2-2), and sample-4 (Comparative Test 2-4) in which a crosslinking water-soluble polymer alone was used, the effects were very low.

TABLE 4

| Sample name | Added amount | Floc diameter | Filtration amount (time) 5 seconds | Filtration amount (time) 20 seconds | Water content |
|---|---|---|---|---|---|
| Example 3 | | | | | |
| 3-1 | Composition-5 | 300 | 7 | 131 | 158 | 68.5 |
| 3-2 | Composition-6 | 300 | 7 | 134 | 154 | 68.2 |
| 3-3 | Composition-7 | 300 | 6 | 122 | 156 | 69.4 |
| 3-4 | Composition-8 | 300 | 7 | 130 | 152 | 68.9 |
| Comparative Test 2 | | | | | |
| 2-1 | Sample-1 | 300 | 3 | 102 | 155 | 72.0 |
| 2-2 | Sample-2 | 300 | 3 | 105 | 156 | 72.0 |
| 2-3 | Sample-3 | 300 | 6 | 120 | 155 | 70.1 |
| 2-4 | Sample-4 | 300 | 3 | 96 | 157 | 71.1 |
| 2-5 | Sample-5 | 300 | 6 | 121 | 154 | 70.5 |

Floc diameter: mm
Filtration amount: mL
Water content: percent by weight
Added amount: amount added to sludge dispersion Example 4

A flocculation-filtration test and a compression test were performed on mixed raw sludge produced in a sewage-treatment plant (sludge properties: pH: 5.25, SS: 22,500 mg/L, TS: 25,000 mg/L) on the assumption that the sludge was treated in a centrifugal dehydrator.

The amount of 200-mesh-on residues of this sludge was 14.9 percent by mass. A 200 mL portion of the sludge was placed in a 300 mL polypropylene beaker. Subsequently, a solution of one of the composition-1 (Example 4-1), composition-2 (Example 4-2), (in these samples, crosslinking water-soluble polymer:linear water-soluble polymer=7:3), composition-5 (Example 4-3), composition-6 (Example 4-4) (in these samples, crosslinking water-soluble polymer:linear water-soluble polymer=3:7), and composition-7 (Example 4-5) (crosslinking water-soluble polymer:linear water-soluble polymer=5:5) shown in Table 2 was added to the sludge. The mixture was stirred at 1,000 rpm for 30 seconds to flocculate the sludge.

Subsequently, the size of the flocs was observed, and the filtration rate was examined using a beaker with filter cloth of 60 mesh. After filtration, the flocculate was pressed and dewatered at a compression pressure of 1 kgf/cm² for 30 seconds, and then the water content of the dewatered cake was determined.

The results are shown in Table 5.

(Comparative Test 3)

The tests were performed on the sample-1 (Comparative Example 3-1), sample-2 (Comparative Example 3-2) (these are crosslinking water-soluble polymers), sample 3 (Comparative Example 3-3) (linear water-soluble polymer), sample-4 (Comparative Example 3-4) (crosslinking water-soluble polymer), and sample-5 (Comparative Example 3-5) (linear water-soluble polymer) shown in Table 1.

The results are shown in Table 5.

The amount of 200-mesh-on residues of the sludge used was 14.9 percent by mass, and the sludge contained a relatively large number of large particles and also a large number of small particles. Therefore, good results were obtained in the composition-7 (Examples 4-5) (crosslinking water-soluble polymer:linear water-soluble polymer=5:5).

However, in the sample-3 (Comparative Example 3-3) and sample-5 (Comparative Example 3-5) in which a linear water-soluble polymer alone was used, the flocculation effects were lower than those of the flocculant compositions of Examples 4-1 to 4-5. In the sample-1 (Comparative Example 3-1), sample-2 (Comparative Example 3-2), and (Comparative Example 3-4) in which a crosslinking water-soluble polymer alone was used, the effects were very low.

TABLE 5

| Sample name | Added amount | Floc diameter | Filtration amount (time) 5 seconds | Filtration amount (time) 20 seconds | Water content |
|---|---|---|---|---|---|
| Example 4 | | | | | |
| 4-1 | Composition-1 | 300 | 7 | 122 | 158 | 69.0 |
| 4-2 | Composition-2 | 300 | 7 | 131 | 154 | 68.8 |
| 4-3 | Composition-5 | 300 | 7 | 132 | 155 | 68.1 |
| 4-4 | Composition-6 | 300 | 7 | 132 | 152 | 68.4 |
| 4-5 | Composition-7 | 300 | 8 | 136 | 156 | 67.7 |
| Comparative Test 3 | | | | | |
| 3-1 | Sample-1 | 300 | 4 | 115 | 155 | 71.8 |
| 3-2 | Sample-2 | 300 | 5 | 121 | 150 | 71.0 |
| 3-3 | Sample-3 | 300 | 6 | 127 | 155 | 69.9 |
| 3-4 | Sample-4 | 300 | 4 | 110 | 156 | 71.7 |
| 3-5 | Sample-5 | 300 | 6 | 126 | 152 | 70.2 |

Floc diameter: mm
Filtration amount: mL
Water content: percent by weight
Added amount: amount added to sludge dispersion

The invention claimed is:

1. A flocculant composition comprising a vinyl crosslinking water-soluble ionic polymer (A) having a charge inclusion ratio of 20% or more and a vinyl linear water-soluble ionic polymer (B) having a charge inclusion ratio of 5% or more and less than 20%, wherein a compounding ratio (a/b) of the vinyl crosslinking water-soluble ionic polymer (A) to the vinyl linear water-soluble ionic polymer (B) is changed according to an amount in percent by mass of 200-mesh particles based on a total mass of suspended particles in a sludge so as to satisfy $0.2 \leq a/b \leq 9$ when $0 < X \leq 10$ percent by mass, $0.4 \leq a/b \leq 3$ when $10 < X \leq 20$ percent by mass, and $0.1 \leq a/b \leq 2$ when $20 < X \leq 60$ percent by mass, where X is an amount of percent of the 200-mesh particles in the sludge, a is an amount in percent by mass of the vinyl crosslinking water-soluble ionic polymer (A), and b is an amount in percent by mass of the vinyl polymer type linear water-soluble ionic polymer (B).

2. The flocculant composition according to claim 1, wherein the vinyl crosslinking water-soluble ionic polymer (A) is obtained by polymerizing a water-soluble monomer mixture of: 5 to 99.9999 percent by mole of a water-soluble monomer represented by the following general formula (1) and/or general formula (2); 0 to 50 percent by mole of a water-soluble monomer represented by the following general formula (3); 0 to 95 percent by mole of a nonionic monomer; and 0.0001 to 0.1 percent by mole of a water-soluble monomer having a plurality of vinyl groups:

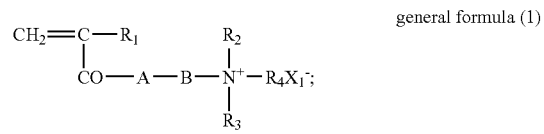

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

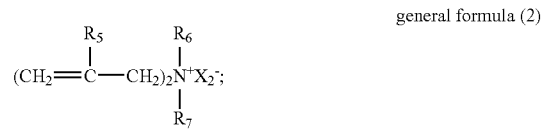

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation.

3. The flocculant composition according to claim 1, wherein the vinyl linear water-soluble ionic polymer (B) is obtained by polymerizing a water-soluble monomer mixture of: 5 to 100 percent by mole of a water-soluble monomer represented by the following general formula (1) and/or general formula (2); 0 to 50 percent by mole of a water-soluble monomer represented by the following general formula (3); and 0 to 95 percent by mole of a nonionic monomer:

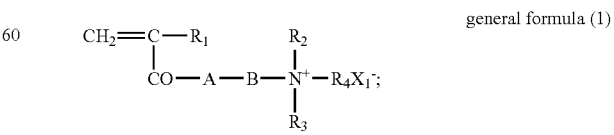

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

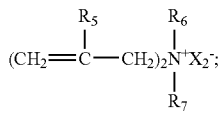

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

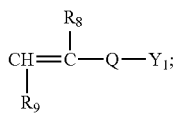

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation.

4. The flocculant composition according to claim 1, wherein one of the vinyl crosslinking water-soluble ionic polymer (A) and the vinyl linear water-soluble ionic polymer (B) is a water-in-oil emulsion produced by: emulsifying the monomers or the monomer mixture and an organic liquid immiscible with water using a high-HLB (hydrophile-lipophile balance) surfactant such that the organic liquid forms a continuous phase and an aqueous solution of the water-soluble monomers forms a disperse phase; and polymerizing the monomers.

5. A method for manufacturing a flocculant composition, characterized by changing a compounding ratio of the vinyl crosslinking water-soluble ionic polymer (A) having a charge inclusion ratio of 20% or more to a vinyl linear water-soluble ionic polymer (B) having a charge inclusion ratio of 5% or more and less than 20% according to a change in percent by mass of 200-mesh particles in sludge based on a total mass of suspended particles in the sludge.

6. The method for manufacturing a flocculant composition according to claim 5, wherein the following relationships are satisfied:

$0.2 \leq a/b \leq 9$ when $0 < X \leq 10$ percent by mass, $0.4 \leq a/b \leq 3$ when $10 < X \leq 20$ percent by mass, and $0.19 \leq a/b \leq 2$ when $20 < X \leq 60$ percent by mass, where X is an amount (percent by mass) of the 200-mesh particles in the sludge, a is an amount (percent by mass) of the vinyl crosslinking water-soluble ionic polymer (A), and b is an amount (percent by mass) of the vinyl linear water-soluble ionic polymer (B).

7. The method for manufacturing a flocculant composition according to claim 5, wherein the vinyl crosslinking water-soluble ionic polymer (A) is obtained by polymerizing a water-soluble monomer mixture of: 5 to 99.9999 percent by mole of a water-soluble monomer represented by the following general formula (1) and/or general formula (2); 0 to 50 percent by mole of a water-soluble monomer represented by the following general formula (3); 0 to 95 percent by mole of a nonionic monomer; and 0.0001 to 0.1 percent by mole of a water-soluble monomer having a plurality of vinyl groups:

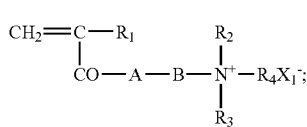

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

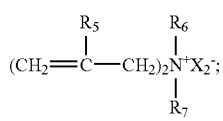

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

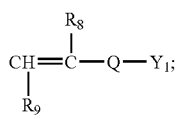

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation.

8. The method for manufacturing a flocculant composition according to claim 5, wherein the vinyl linear water-soluble ionic polymer (B) is obtained by polymerizing a water-soluble monomer mixture of: 5 to 100 percent by mole of a water-soluble monomer represented by the following general formula (1) and/or general formula (2); 0 to 50 percent by mole of a water-soluble monomer represented by the following general formula (3); and 0 to 95 percent by mole of a nonionic monomer:

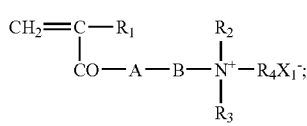

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

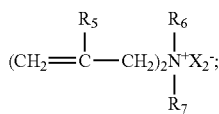

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

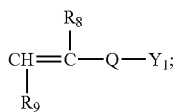

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(CH_3)_2CH_2SO_3$, $C_6H_4COO$, or COO; $R_9$ is hydrogen or $COOY_1$; and $Y_1$ is hydrogen or a cation.

9. The method for manufacturing a flocculant composition according to claim 5, wherein one of the vinyl crosslinking water-soluble ionic polymer (A) and the vinyl linear water-soluble ionic polymer (B) is a water-in-oil emulsion produced by: emulsifying the monomers or the monomer mixture in an organic liquid immiscible with water using a high-HLB (hydrophile-lipophile balance) surfactant such that the organic liquid forms a continuous phase and an aqueous solution of the water-soluble monomers forms a disperse phase; and polymerizing the monomers.

10. The method for manufacturing a flocculant composition according to claim 6, wherein the vinyl crosslinking water-soluble ionic polymer (A) is obtained by polymerizing a water-soluble monomer mixture of: 5 to 99.9999 percent by mole of a water-soluble monomer represented by the following general formula (1) and/or general formula (2); 0 to 50 percent by mole of a water-soluble monomer represented by the following general formula (3); 0 to 95 percent by mole of a nonionic monomer; and 0.0001 to 0.1 percent by mole of a water-soluble monomer having a plurality of vinyl groups:

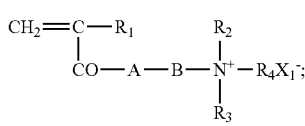

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

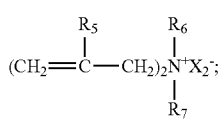

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

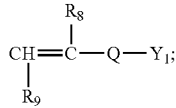

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(H_3)_2CH_2SO_3$, $C_6H_4COO$, or COO; $R_9$ is hydrogen or $COOY_1$; and $Y_1$ is hydrogen or a cation.

11. The method for manufacturing a flocculant composition according to claim 6, wherein the vinyl linear water-soluble ionic polymer (B) is obtained by polymerizing a water-soluble monomer mixture of: 5 to 100 percent by mole of a water-soluble monomer represented by the following general formula (1) and/or general formula (2); 0 to 50 percent by mole of a water-soluble monomer represented by the following general formula (3); and 0 to 95 percent by mole of a nonionic monomer:

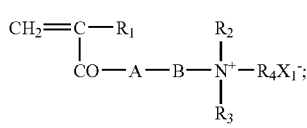

general formula (1)

wherein $R_1$ is hydrogen or a methyl group; $R_2$ and $R_3$ each are an alkyl or alkoxyl group having 1 to 3 carbon atoms; $R_4$ is hydrogen, an alkyl or alkoxy group having 1 to 3 carbon atoms, or a benzyl group; $R_1$ to $R_4$ may be the same or different; A is oxygen or NH; B is an alkylene or alkoxylene group having 2 to 4 carbon atoms; and $X_1$ is an anion;

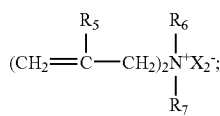

general formula (2)

wherein $R_5$ is hydrogen or a methyl group; $R_6$ and $R_7$ each are an alkyl or alkoxy group having 1 to 3 carbon atoms or a benzyl group; and $X_2$ is an anion; and

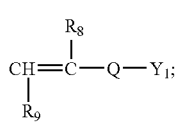

general formula (3)

wherein $R_8$ is hydrogen, a methyl group, or $CH_2COOY_2$, wherein $Y_2$ is hydrogen or a cation; Q is $SO_3$, $C_6H_4SO_3$, $CONHC(CH*CH_2SO_3$, $C_6H_4COO$, or COO; $R_9$ is hydrogen or $COOY_1$; and $Y_1$ is hydrogen or a cation.

12. The method for manufacturing a flocculant composition according to claim 5, wherein one of the vinyl crosslinking water-soluble ionic polymer (A) and the vinyl linear water-soluble ionic polymer (B) is a water-in-oil emulsion produced by: emulsifying the monomers or the monomer mixture in an organic liquid immiscible with water using a high-HLB (hydrophile-lipophile balance) surfactant such that the organic liquid forms a continuous phase and an aqueous solution of the water-soluble monomers forms a disperse phase; and polymerizing the monomers.

* * * * *

UNITED STATES PATENT AND TRADEMARK OFFICE
CERTIFICATE OF CORRECTION

| | | |
|---|---|---|
| PATENT NO. | : 7,745,529 B2 | |
| APPLICATION NO. | : 12/362916 | |
| DATED | : June 29, 2010 | |
| INVENTOR(S) | : Ryousuke Yonemoto et al. | |

It is certified that error appears in the above-identified patent and that said Letters Patent is hereby corrected as shown below:

Front, Abstract, the two paragraphs should be combined to make one paragraph.

Front, Abstract, lines 1-2, "flocculent" should read --flocculant--;

Front, Abstract, line 12, "flocculent" should read --flocculant--;

Column 1, line 23, "flocculent" should read --flocculant--;

Column 2, line 59, "flocculent" should read --flocculant--;

Column 3, line 40, "flocculent" should read --flocculant;

Column 7, line 8, "flocculent" should read --flocculant--;

Column 7, line 16, "flocculent" should read --flocculant--;

Column 8, line 30, "($\beta$is" should read --($\beta$ is--;

Column 10, line 32, "flocculent" should read --flocculant--;

Column 10, line 35, "flocculent" should read --flocculant--;

Column 14, line 15, "anitrogen" should read --a nitrogen--;

Column 16, lines 65-66, "the (Comparative Test 105)" should read --the sample-5 (Comparative Test 1-5)--;

Column 19, lines 21-22, "and (Comparative Example 3-4)" should read --and sample-4 (Comparative Example 3-4)--;

Signed and Sealed this
Sixteenth Day of August, 2011

David J. Kappos
*Director of the United States Patent and Trademark Office*

CERTIFICATE OF CORRECTION (continued)
U.S. Pat. No. 7,745,529 B2

Column 19, line 70, delete "polymer type";

Column 24, line 14, "CONHC($H_3$)" should read --CONHC($CH_3$)--; and

Column 24, line 60, "CONHC(CH*$CH_2SO_3$" should read --CONHC($CH_3$)$_2CH_2SO_3$--.